United States Patent [19]

Krespan et al.

[11] Patent Number: 5,286,822
[45] Date of Patent: Feb. 15, 1994

[54] PERFLUOROALKYL SULFIDE POLYMER SOLVENTS FOR FLUOROMONOMER POLYMERIZATION

[75] Inventors: Carl G. Krespan; Robert C. Wheland, both of Wilmington, Del.

[73] Assignee: E. I. Du Pont de Nemours and Company, Wilmington, Del.

[21] Appl. No.: 12,692

[22] Filed: Feb. 3, 1993

[51] Int. Cl.⁵ ................................................ C08F 2/06
[52] U.S. Cl. .................................. 526/204; 526/247; 526/255; 526/221
[58] Field of Search ............... 526/204, 247, 255, 221

[56] References Cited

U.S. PATENT DOCUMENTS

| 2,931,803 | 4/1960 | Krespan | 524/82 |
| 3,275,609 | 9/1966 | Raasch | 526/204 |
| 3,544,591 | 12/1970 | England | 549/89 |
| 4,326,068 | 4/1982 | Anello et al. | 549/89 |
| 4,329,478 | 5/1982 | Behr | 526/204 |
| 4,332,954 | 6/1982 | Koshar | 526/204 |
| 5,169,915 | 12/1992 | Mohri et al. | 526/247 |

FOREIGN PATENT DOCUMENTS 1495355  4/1969  Fed. Rep. of Germany ...... 526/204

Primary Examiner—Joseph L. Schofer
Assistant Examiner—N. Sarofin

[57] ABSTRACT

A novel process for the free radical polymerization of fluoromonomers in which perfluoroalkyl sulfide solvents are used is disclosed. The solvents have little effect on atmospheric temperature and ozone concentrations. The polymers produced are useful as thermoplastics and elastomers.

15 Claims, No Drawings

PERFLUOROALKYL SULFIDE POLYMER SOLVENTS FOR FLUOROMONOMER POLYMERIZATION

FIELD OF THE INVENTION

This invention relates to a fluoromonomer polymerization process conducted in the presence of an initiator and in a perfluroalkyl sulfide solvent. Such solvents are useful as replacements for CFC solvents in fluoroolefin polymerizations and serve as activators for perfluoroacyl peroxide initiators. The polymers obtained are useful as thermoplastics and elastomers.

TECHNICAL BACKGROUND

Fluoroolefins are often polymerized in the presence of either fluorocarbon or chlorofluorocarbon solvents. Use of these solvents may be less desirable in the near future because of their potential for environmental damage as greenhouse gases and ozone depleters. New solvents are needed that do not contain chlorine and are reactive enough to degrade rapidly in the atmosphere, yet stable enough not to interfere with radical fluoroolefin polymerization. The perfluoroalkyl sulfides disclosed herein appear to meet the reactivity criterion in that they degrade in UV light and air yet can usefully survive the peroxide initiators commonly used in fluorolefin polymerization.

U.S. Pat. No. 2,931,803 at column 6, lines 39–42 describes octafluoro-1,4-dithiane and octafluorothiolane as used for aerosol solvents. That disclosure does not mention the use of these solvents in fluoromonomer polymerization or initiator activation.

SUMMARY OF THE INVENTION

The invention concerns a polymerization process, comprising contacting a fluoromonomer, a free radical source capable of initiating polymerization of said fluoromonomer, and a solvent selected from formulas I and II, below:

where $R_f$ and $R'_f$ have the composition $CF_3(C_nF_{2n})$- or $HCF_2(C_nF_{2n})$- where $n=0$ to 9, are the same or different, are either linear or a chain containing one or more branches, and optionally containing one or more ether oxygens; and

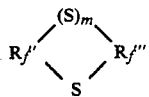

II where $m=0$ or 1; $R_f''$ and $R_f'''$ are the same or different and have the formula $—C_xF_{2x}—$ where $X=1$ to 3;

provided that $R_f''$ and $R_f'''$ taken together contain at least 4 Carbon atoms when $m=0$;

and further provided that the solvent described by formulas I and II is a fluid under polymerizing conditions.

Preferred solvent embodiments for structure II occur where $m=1$ and $X=1$; $m=1$ and $X=2$ and where $m=0$.

Preferred embodiments for structure I occur where $n=1$ and $n=3$.

DETAILS OF THE INVENTION

This invention concerns improved solvents for use in the polymerization of fluoromonomers. The resulting polymers are useful as thermoplastics and elastomers. By fluoromonomers are meant compounds that may be free radically polymerized, that contain at least one vinylic fluorine atom attached to the vinyl group that undergoes polymerization, and the compounds 3,3,3-trifluoropropene, perfluoro(butyl)ethylene and 2-trifluoromethyl-3,3,3-trifluoro-1-propene. Useful fluoromonomers containing a vinylic fluorine atom include, but are not limited to, vinyl fluoride; vinylidene fluoride; trifluoroethylene; chlorotrifluoroethylene; 1,2-difluoroethylene; tetrafluoroethylene; hexafluoropropylene; perfluoro(methyl vinyl ether); perfluoro(propyl vinyl ether); perfluoro(2,2-dimethyl-1,3-dioxole); $CF_2=CFOCF_2CF(CF_3)OCF_2CF_2SO_2F$; $CF_2=CFOCF_2CF(CF_3)OCF_2CF_2CO_2CH_3$; $CF_2=CFOCF_2CF_2SO_2F$; $F(CF_2)_nCH_2OCF=CF_2$ where n is 1, 2, 3, 4, or 5; $R^1CH_2OCF=CF_2$ where $R^1$ is hydrogen or $F(CF_2)_m$- and m is 1, 2, or 3; and $R^3OCF=CH_2$ where $R^3$ is $F(CF_2)_z$- where z is 1, 2, 3, or 4. Preferred fluorinated monomers are 3,3,3-trifluoropropene, perfluoro(butyl)ethylene, 2-trifluoromethyl-3,3,3-trifluoro-1-propene, vinyl fluoride, vinylidene fluoride, tetrafluoroethylene, hexafluoropropylene, perfluoro(methyl vinyl ether), perfluoro(propyl vinyl ether), and perfluoro(2,2-dimethyl-1,3-dioxole).

The fluoromonomer may be polymerized alone to form a homopolymer, if the fluoromonomer usually can be homopolymerized, or may be polymerized with one or more other fluoromonomers or other monomers which are not fluoromonomers to form a copolymer. If a copolymer is to be formed, the monomers chosen must be able to copolymerize. Such copolymerizable monomer combinations are known, see for example D. P. Carlson and W. Schmiegel, in W. Gerhartz, et al., Ed., Ullmann's Encyclopedia of Industrial Chemistry, 5th Ed., vol. A11, VCH Verlagsgesellschaft mbH, Weinheim, 1988, p. 393–429, and various individual articles in H. Mark et al., Ed., Encyclopedia of Polymer Science and Engineering, John Wiley & Sons, New York, 1985, both of which are hereby included by reference. Comonomers that copolymerize with some combinations of fluoromonomers include propylene and ethylene. Useful copolymers that can be made by the instant process include, but are not limited to, tetrafluoroethylene/hexafluoropropylene, tetrafluoroethylene/hexafluoropropylene/vinylidene fluoride, hexafluoropropylene/vinylidene fluoride, tetrafluoroethylene/perfluoro (propyl vinyl ether), tetrafluoroethylene/perfluoro (2,2-dimethyl-1,3-dioxole), tetrafluoroethylene/ethylene, tetrafluoroethylene/-$CF_2=CFOCF_2CF(CF_3)OCF_2CF_2SO_2F$, tetrafluoroethylene/-$CF_2=CFOCF_2CF_2SO_2F$, tetrafluoroethylene/hexafluoropropylene/perfluoro propyl vinyl ether and tetrafluoroethylene/propylene. If a copolymer is made, it is preferred if at least 1%, more preferably at least about 10%, and especially preferable at least about 25%, of the total monomer units present in the polymer be fluoromonomers.

The process requires a free radical source which is capable of polymerizing the fluoromonomer and other monomers present. Typically, such free radical sources include organic compounds capable of thermally decomposing to free radical species, and in aqueous systems (see below) redox type initiators are often used.

However, any source of appropriate free radicals may be used in the process for instance an organic compound that decomposes on exposure to ultraviolet light, assuming that the apparatus used for the process allows the process medium to be exposed to ultraviolet light. Not all free radical sources will polymerize any particular fluoromonomer or combination of monomers. Free radical sources effective with various fluoromonomers and monomer combinations are known. See, for example, J. C. Masson in J. Brandrup and E. H. Immergut, Ed., Polymer Handbook, 3rd Ed., John Wiley & Sons, New York, 1989, p. II/1-II/65, and C. S. Sheppard and V. Kamath in H. F. Mark. et al., Ed., Encyclopedia of Chemical Technology, 3rd Ed., vol. 13, John Wiley & Sons, New York, 1981, p. 355-373, both of which are here included by reference.

Suitable free radical sources include fluorocarbon based acylperoxides such as HFPO dimer peroxide, $[CF_3CF_3CF_2OCF(CF_3)COO]_2$, perfluoropropionyl peroxide, $(CF_3CF_2COO)_2$, $\{CF_3CF_2CF_2O[CF(CF_3)CF_2O]nCF(CF_3)COO\}_2$, $[CF_3(CF_2)nCOO]_2$, $[HCF_2(CF_2)nCOO]_2$, and $[ClCF_2(CF_2)nCOO]_2$, where n=0 to 8; perfluoroalkylazo compounds, such as perfluoroazoisopropane, $[(CF_3)_2CFN=]_2$, $R_fN=NR_f$ where $R_f$ is a straight chain or branched perfluorocarbon group $C_nF_{2n+1}$, n=1 to 8; stable perfluoroalkyl radicals/-hindered perfluoroalkanes, such as HFP trimer radical, $[(CF_3)_2CF]_2CCF_2CF_3$ radical and pefluoroalkanes, see EP-312-558A; nitrogen fluorides such as nitrogen trifluoride, $(NF_3)$; hydrocarbon acyl peroxides, such as acetyl peroxide and isobutyryl peroxide; hydrocarbon azo compounds, such as azobisisobutyronitrile and azobioisovaleronitrile; inorganic/redox initiators, such as persulfate and persulfate+bisulfite. Preferred initiators are HFPO dimer peroxide, perfluoropropionylperoxide, perfluoroazoisopropane, and HFP trimer radical, all of which are exemplified herein.

Perfluoroacyl peroxide initiators can be made according to U.S. Pat. No. 5,021,516 or according to Z. Chengxue, et al., J. Org. Chem. 1982, 47, 2009, both of which are incorporated herein by reference.

Solvents used in the instant process can perform one or more than one function. They may be used as solvents for one or more of the constituents such as a monomer or free radical source, since adding such ingredients as solutions may be more convenient or accurate. The solvent may actually function as a solvent for the polymer that is made in the process (although the term solvent in this case does not necessarily imply that the polymer formed is soluble in the solvent), so that a true solution polymerization is carried out. However, solvent, as used herein, may also be present in other types of polymerizations, such as aqueous emulsion or suspension, or nonaqueous suspension polymerizations.

It is desirable that the solvent be readily removed from the polymer once the polymerization is completed. Solvents are often removed by distillation or evaporation, so it is preferred if the solvent is volatile. Thus, the boiling point of the solvent described herein is no higher than about 150° C., preferred if it is no higher than 120° C. and more preferred if it is no higher than 100° C. Conversely, the solvent should not have a very low boiling point. Solvents that boil well below process temperature add their vapor pressure to the total pressure generated in the process, which may lead to the need for more expensive process equipment capable of holding higher pressures, or could inadvertently evaporate leaving possibly dangerous residues (e.g., peroxide residue if peroxide is used as the initiator). Thus, the solvent has an atmospheric pressure boiling point of about 0° C. or higher, preferably about 20° C. or higher. It is preferred if the solvent has a boiling point of about 0° C. to about 150° C., more preferred if the solvent has a boiling point of about 20° C. to about 120° C., and especially preferred if the solvent has a boiling point of about 20° C. to about 100° C. The solvent must be a fluid at polymerization temperatures.

Certain monomers may not be polymerizable in all solvents. The polymerizability of a monomer in a particular solvent is readily determined by carrying out a small scale polymerization. Such small scale polymerizations involve minimal experimentation.

Within any given set of process conditions, e.g., fluoromonomer, temperature, it is expected that the fluoroalkyl sulfide solvents described here will generally result in relatively insignificant amounts of chain transfer, and little or no termination. Other components in the system, particularly monomers and initiators containing hydrogen or chlorine, may contribute more than the perfluoroalkyl sulfide solvents to transfer and termination, and this can become the major limiting factor in choosing process conditions. A practical process does not necessarily depend on having no chain transfer and/or termination, but only on having minimal amounts of either or both, so that the polymer produced has acceptable properties.

The polymerization reactions proceed at temperatures below about 280° C. Temperatures of about −20° to about 200° C. are preferred. Temperatures of about −20° C. to about 80° C. are most preferred.

EXAMPLES

EXPERIMENTAL PROCEDURES

In the following examples melt index tests were run using a Slocomb Model F extrusion plastometer with a 316 stainless steel die 0.947 cm in diameter and with a hole 0.318 cm long and 0.0794 cm in diameter. The plastometer was heated to 297° or 372° C., depending on the polymer. After loading 2 g samples of polymer reinserting the piston, and waiting for 5 min for thermal equilibration, the piston was loaded with a dead weight so that the piston and dead weight together total 5 or 15 kg, as appropriate for the viscosity of the sample. The time required for all or part of the polymer to be extruded was measured, stopping after 5 min for polymers showing no extrusion at all. The weight of polymer extruded divided by the number of minutes over which the extrusion occurred is reported here as the melt index.

EXAMPLE 1

Degradation of Octafluoro-1,4-dithiane with $O_2$+Light

A quartz reactor containing 9.31 g (0.035 mol) of pure octafluoro-1,4-dithiane was maintained under one atmosphere of oxygen while the liquid was stirred at 25° C. Irradiation with a spiral low-pressure mercury lamp (254 nm light) was carried out for 8 hr while oxygen was passed through continuously, but very slowly. Off-gases passing through a water-cooled condenser and a gas-sampling bulb were analyzed by IR, exhibiting an approximate composition of 50% $COF_2$, 25% $CO_2$, 5–10% $SO_2$, and 30% octafluoro-1,4-dithiane with only traces of other components present. A −80° C. trap connected to the end of the system collected 0.3 g of products shown by GC/MS to contain chiefly octafluoro-1,4-dithiane with small amounts of SO₂, CF₃COF, octafluorothiolane, and materials believed to be SO₂F₂ and hexafluoro-1,3-dithiolane.

Residual liquid and a small amount of solid in the reactor weighed 6.2 g. Analysis by GC/MS indicated it to be 95.7% recovered octafluoro-1,4-dithiane, with disulfide, trisulfide and tetrasulfide components present along with traces of the lower boilers seen in the cold trap.

EXAMPLE 2

Bis(perfluoro-n-butyl) Sulfide/H₂O Solvent Tetrafluoroethylene/Perfluoropropylvinyl Ether Copolymer A 400-mL pressure vessel was loaded with 100 mL of deionized water. The pressure vessel was then chilled and maintained around −20° C. while further loading with 20 mL of 0.05M HFPO dimer peroxide in bis(perfluoro-n-butyl) sulfide, pulling the air off with a vacuum pump, adding 5 g of perfluoropropylvinyl ether, and finally adding 50 g of tetrafluoroethylene. Polymerization set in during warm up, pressure dropping from 213 psi at −6° C. to 68 psi at 2.8° C. over a 10 minute period. The pressure continued to drop, falling to 55 psi four to five hours later at 35° C. The product was washed three times with 300 mL of 1:1 methanol:water, filtered, and dried under vacuum, giving 55.2 g of white powder (∼100% conversion). Infrared analysis found 4.5 wt % perfluoropropylvinyl ether in the copolymer with tetrafluoroethylene. Molecular weight was too high for melt flow to be measured at 372° C. under standard melt indexer conditions.

EXAMPLE 3

Bis(perfluoro-n-butyl) Sulfide Solvent Tetrafluoroethylene/Perfluoropropylvinyl Ether Copolymer A 400-mL pressure vessel was loaded with 100 mL of bis(perfluoro-n-butyl) sulfide. The pressure vessel was then chilled and maintained around −20° C. while further loading with 20 mL of 0.05M HFPO dimer peroxide in bis(perfluoro-n-butyl) sulfide, pulling the air off with a vacuum pump, adding 5 g of perfluoropropylvinyl ether, and finally adding 50 g of tetrafluoroethylene. Polymerization set in during warm up, pressure dropping from 96 psi at 4.4° C. to 86 psi at 85° C. over a 14 minute period. The pressure continued to drop, falling to 3 psi four to five hours later at 35° C. The product was washed three times with 200 mL of 1:1 methanol:water, filtered, and dried under vacuum, giving 58 g of white powder (∼100% conversion). Infrared analysis found 3.7 wt % perfluoropropylvinyl ether in the copolymer with tetrafluoroethylene. The polymer extruded through a melt indexer at 0.4 g/min at 372° C. with a 15-kg weight.

EXAMPLE 4

Octafluoro-1,4-dithiane/H₂O Solvent Tetrafluoroethylene/Hexafluoropropylene Copolymer A 400-mL pressure vessel was loaded with 100 mL of deionized water. The pressure vessel was then chilled and maintained around −20° C. while further loading with 5 mL of 0.06M HFPO dimer peroxide in octafluoro-1,4-dithiane, pulling the air off with a vacuum pump, adding 240 g of hexafluoropropylene, and finally adding 50 g of tetrafluoroethylene. Polymerization was carried out at ∼35° C. with pressure dropping from 118 to 102 psi over about 4 to 5 hours. The product was washed two times with 200 mL of methanol and once with 200 mL of Freon ® 113, filtered, and dried under vacuum, giving 33.8 g of white powder. Infrared analysis found 9.0 wt % hexafluoropropylene in the copolymer suggesting ∼61% conversion on the part of the tetrafluoroethylene. Under melt indexer conditions, melt flow was 4.0 g/min at 372° C. with a 5-kg weight.

EXAMPLE 5

Octafluoro-1,4-dithiane/H₂O Solvent Poly(vinyl fluoride)

A 400-mL pressure vessel was loaded with 200 mL of deionized water. The pressure vessel was then chilled and maintained around −20° C. while further loading with 5 mL of 0.06M HFPO dimer peroxide in octafluoro-1,4-dithiane, pulling the air off with a vacuum pump, and finally adding 100 g of vinyl fluoride. Polymerization set in during warm up, pressure dropping from 550 psi at 42.5° C. to 432 psi at 35° C. over four to five hours. The product was washed two times with 200 mL of methanol and once with 200 mL of Freon ® 113, filtered, and dried under vacuum, giving 48.5 g of white powder (∼48% conversion).

EXAMPLE 6

Bis(perfluoroethyl) Sulfide/H₂O Solvent Tetrafluoroethylene/Ethylene Copolymer

A 400-mL pressure vessel was loaded with 200 mL of deionized water. The pressure vessel was then chilled and maintained around −20° C. while further loading with 15 mL of 0.025M HFPO dimer peroxide in bis(perfluoroethyl) sulfide, pulling the air off with a vacuum pump, adding 14 g of ethylene, and finally adding 50 g of tetrafluoroethylene. Polymerization set in during warm up, pressure dropping from 290 psi at −5° C. to 268 psi at 61° C. over a 15 minute period. The pressure continued to drop, falling to 39 psi three to four hours later at 35° C. The product was washed two times with 200 mL of 1:1 methanol:water and once with 200 mL of Freon ® 113, filtered, and dried under vacuum, giving 68 g of white powder (-100% conversion). Under melt indexer conditions, no melt flow was observed at 297° C. with a 15-kg weight.

EXAMPLE 7

Bis(perfluoroethyl) Sulfide/H₂O Solvent Tetrafluoroethylene/Perfluoropropylvinyl Ether Copolymer A 400-mL pressure vessel was loaded with 200 mL of deionized water. The pressure vessel was then chilled and maintained around −20° C. while further loading with 15 mL of 0.025M HFPO dimer peroxide in bis(perfluoroethyl) sulfide, pulling the air off with a vacuum pump, adding 5 g of perfluoropropylvinyl ether, and finally adding 50 g of tetrafluoroethylene. Polymerization set in during warm up, exotherming from 163 psi at −10° C. to 189 psi at 77° C. over a 15-minute period. The pressure thereafter dropped, falling to 137 psi three to four hours later at 23° C. The product was washed two times with 200 mL of 1:1 methanol:water and once with 200 mL of Freon ® 113, filtered, and dried under vacuum, giving 54 7 g of white powder (∼100% conversion). Infrared analysis found 4.3 wt % perfluoropropylvinyl ether in the copolymer with tetrafluoroethylene. Under melt indexer conditions, no melt flow was observed at 372° C. with a 15-kg weight.

These and similar results are summarized in Tables 1 to 4 in which the following abbreviations are used:

| | |
|---|---|
| TFE | Tetrafluoroethylene |
| HFP | Hexafluoropropylene |
| PPVE | Perfluoropropylvinyl ether |
| E | Ethylene |
| VF | Vinyl fluoride |
| HFPOP | $[CF_3CF_2CF_2OCF(CF_3)COO]_2$, the diacyl peroxide from HFPO dimer acid fluoride |
| $C_8F_{18}S$ | $CF_3CF_2CF_2CF_2SCF_2CF_2CF_2CF_3$ |
| $C_4F_8S_2$ | Octafluorodithiane, |

| | |
|---|---|
| $C_4F_{10}S$ | Bis(perfluoroethyl) sulfide |
| CFC | Hydrofluorocarbon |

TABLE 1
POLYMERIZATIONS IN BIS(PERFLUORO-n-BUTYL) SULFIDE/H$_2$O SEMIAQUEOUS CONDITIONS AS IN EXAMPLE 2

| INITIATOR | MONOMER(S) | CONVERSION | MELT INDEX |
|---|---|---|---|
| HFPOP/ $C_8F_{18}S$ | TFE/PPVE | ~100% | 0 (15 kg, 372° C.) |
| HFPOP/ $C_8F_{18}S$ | TFE/E | ~100% | 0 (15 kg, 297° C.) |
| HFPOP/ $C_8F_{18}S$ | TFE/HFP | 71% of TFE | 1.3 g/min (5 kg, 372° C.) |

TABLE 2
POLYMERIZATIONS IN BIS(PERFLUORO-n-BUTYL) SULFIDE/NONAQUEOUS CONDITIONS AS IN EXAMPLE 3

| INITIATOR | MONOMER(S) | CONVERSION | MELT INDEX |
|---|---|---|---|
| HFPOP/ $C_8F_{18}S$ | TFE/PPVE | ~100% | 0.4 g/min (15 kg, 372° C.) |
| HFPOP/ $C_8F_{18}S$ | TFE/E | 61% | 0.3 g/min (15 kg, 297° C.) |
| HFPOP/ $C_8F_{18}S$ | TFE/HFP | 90% of TFE | 4 g/min (15 kg, 372° C.) |

TABLE 3
POLYMERIZATIONS IN OCTAFLUORO-1,4-DITHIANE/H$_2$O SEMIAQUEOUS CONDITIONS AS IN EXAMPLE 4

| INITIATOR | MONOMER(S) | CONVERSION | MELT INDEX |
|---|---|---|---|
| HFPOP/ $C_4F_8S_2$ | TFE/PPVE | ~79% OF TFE | 0 g/min (15 kg, 372° C.) |
| HFPOP/ $C_4F_8S_2$ | TFE/PPVE | ~81% OF TFE | 0 g/min (15 kg, 372° C.) |
| HFPOP/ $C_4F_8S_2$ | TFE/HFP | ~66% OF TFE | 3 g/min (15 kg, 372° C.) |
| HFPOP/ $C_4F_8S_2$ | TFE/HFP | ~61% OF TFE | 4 g/min (5 kg, 372° C.) |
| HFPOP/ $C_4F_8S_2$ | VF | ~48% OF VF | |
| HFPOP/ $C_4F_8S_2$ | VF | ~42% OF VF | |

TABLE 4
POLYMERIZATIONS IN BIS(PERFLUOROETHYL) SULFIDE/H$_2$O CONDITIONS AS IN EXAMPLE 6

| INITIATOR | MONOMER(S) | CONVERSION | MELT INDEX |
|---|---|---|---|
| HFPOP/ $C_4F_{10}S$ | TFE/PPVE | ~100% of TFE | 0 g/min (15 kg, 372° C.) |
| HFPOP/ $C_4F_{10}$ | TFE/HFP | ~80% OF TFE | 0.04 g/min (15 kg, 372° C |
| HFPOP/ $C_4F_8S_2$ | TFE/E | ~100% OF TFE | 0 g/min (15 kg, 297° C.) |

Unexpectedly, polymerizations initiated with HFPO dimer peroxide in either the presence or absence of water appear to start up at lower temperatures than usual. In Applicants' equipment this is most noticeable in fast copolymerizations such as TFE/PPVE and TFE/E where the start up of polymerization is observed as a pressure drop or an exotherm. Table 5 below shows the last temperature recorded before polymerization became evident either as a pressure drop or an exotherm.

TABLE 5
TEMPERATURE OF ONSET OF POLYMERIZATION

| MONOMERS | SOLVENT | TEMPERATURE |
|---|---|---|
| TFE/PPVE | $C_4F_{10}S/H_2O$ | -10° C. |
| TFE/PPVE | $C_4F_{10}S/H_2O$ | 4° C. |
| TFE/PPVE | $C_8F_{18}S/H_2O$ | -6° C. |
| TFE/PPVE | $C_8F_{18}S$ | 4° C. |
| TFE/PPVE | $C_4F_8S_2/H_2O$ | 3° C. |
| TFE/PPVE | $C_4F_8S_2/H_2O$ | 4° C. |
| TFE/E | $C_4F_{10}S/H_2O$ | -5° C. |
| TFE/E | $C_8F_{18}S/H_2O$ | 1° C. |
| TFE/E | $C_8F_{18}S$ | 32° C. |
| TFE/PPVE | $C_4H_4F_4[1]/H_2O$ | 20° C. |
| TFE/PPVE | $C_4H_4F_4[1]/H_2O$ | 19° C. |
| TFE/PPVE | $C_8F_{18}O_2[2]/H_2O$ | 28° C. |
| TFE/PPVE | $C_5F_6H_4O_2[3]$ | 21° C. |
| TFE/PPVE | $C_5F_6H_4O_2[3]$ | 25° C. |
| TFE/PPVE | $C_5F_{10}H_2[4]$ | 25° C. |
| TFE/PPVE | $C_5F_{10}H_2[4]$ | 19° C. |
| TFE/E | $H(CF_2)_4H$ | 13° C. |
| TFE/E | $H(CF_2)_4H$ | 8° C. |

[1]$C_4H_4F_4$: 1,1,2,2-tetrafluorocyclobutane
[2]$C_8F_{18}O_2$: $CF_3CF_2CF_2OCF(CF_3)CF_2OCF_2CF_3$
[3]$C_5F_6H_4O_2$: 1,1,-bis(trifluoromethyl)-2,5-dioxolane
[4]$C_5H_{10}H_2$: $CF_3CFHCFHCF_2CF_3$ The first nine runs in Table 5, made in the presence of perfluoroalkyl sulfide solvents, started up at an average temperature of 3° C., whereas the last nine runs in Table 5, made in the presence of ordinary fluorinated solvents, started up at an average temperature of 20° C.

A typical high temperature run employing fluorocarbon solvent is described in Comparative Example 1 below. Using perfluoroalkyl sulfide solvent to run at lower reaction temperatures has the advantages of decreasing chain transfer on the part of monomers such as PPVE and VF and of increasing initiator efficiency for a given temperature and reaction time (more of the initiator breaks down to radicals leaving less to be discarded during work up).

COMPARATIVE EXAMPLE 1

Example Of Higher Startup Temperature With HFC 1,1,2,2-Tetrafluorocyclobutane/H$_2$O Solvent Tetrafluoroethylene/Perfluoropropylvinyl Ether Copolymer A 400-mL pressure vessel was loaded with 100 mL of deionized water. The pressure vessel was then chilled and maintained around -20° C. while further loading with 5 mL of 0.05M HFPO dimer peroxide in 1,1,2,2-tetrafluorocyclobutane, pulling the air off with a vacuum pump, adding 5 g of perfluoropropylvinyl ether, and finally adding 50 g of tetrafluoroethylene. Polymerization set in during warm up, first pressure drop occurring above 20° C. The pressure thereafter dropped, falling to 43 psi three to four hours later at 35° C. The product was washed three times with 200 mL of methanol and once with 200 mL of Freon ® 113, filtered, and dried under vacuum, giving 38 g of white powder that analysed for 2.6 weight percent PPVE by IR. Under melt indexer conditions, no melt flow was observed at 372° C. with a 15-kg weight.

EXAMPLE 8

Bis(perfluoro-n-butyl) Sulfide/H$_2$O Solvent Tetrafluoroethylene Homopolymer at 60° to 100° C.

A 400-mL pressure vessel was loaded with 100 ml of deionized water and 10 mL of bis(perfluoro-n-butyl) sulfide containing 0.2 ml of ~15% [(CF$_3$)$_2$CF]$_2$ĊCF$_2$CF$_3$ radical in [(CF$_3$)$_2$CF]$_2$C=CFCF$_3$ precursor (K. Scherer et al., J. Am. Chem. Soc., 1985, 107, 718). The pressure vessel was then chilled and maintained around −20° C. while pulling the air off with a vacuum pump and finally adding 50 g of tetrafluoroethylene. Polymerization set in during warm up, exotherming from 464 psi at 63° C. to 456 psi at 99° C. over a 13-minute period. The pressure thereafter dropped, falling to 17 psi four to five hours later at 101° C. The product was washed once with 200 mL of 1:1 methanol:water and twice with 200 mL of Freon ® 113, filtered, and dried under vacuum, giving 49.8 g of white powder (~100% conversion). Under melt indexer conditions, no melt flow was observed at 372° C. with a 15-kg weight.

EXAMPLE 9

Bis(perfluoro-n-butyl) Sulfide/H$_2$O Solvent Tetrafluoroethylene/Ethylene Copolymer Perfluoropropionyl Peroxide Initiation A 400-ml vessel was loaded with 100 mL of deionized water. The pressure vessel was then chilled and maintained around −20° C. while further loading with 5 ml of 0.036M perfluoropropionyl peroxide in bis(perfluoro-n-butyl) sulfide, pulling the air off with a vacuum pump, adding 14 g of ethylene, and finally adding 50 g of tetrafluoroethylene. Polymerization set in during warm up at 59° C. and 892 psi, pressure continuing to drop to 751 psi at 60° C. about 4 hours later. The product was washed with 200 ml of 1:1 methanol:water, filtered, and dried under vacuum, giving 18.7 g of white powder (29%). Under melt indexer conditions, no melt flow was observed at 297° C. with a 15-kg weight.

EXAMPLE 10

Bis(perfluoro-n-butyl) Sulfide/H$_2$O Solvent Tetrafluoroethylene Homopolymer Perfluoroazoisopropane Initiation at 150°–180° C.

A 400-ml vessel was loaded with 100 mL of deionized water and 10 ml of bis(perfluoro-n-butyl) sulfide containing 0.10 mL of perfluoroazoisopropane, (CF$_3$)$_2$CFN=NCF(CF$_3$)$_2$. The pressure vessel was then chilled to ~ −25° C., the air removed with a vacuum pump, and 25 g of tetrafluoroethylene added. Polymerization set in during warm up first becoming noticeable as a pressure drop at 152° C. and 436 psi and finishing at 181° C. and 204 psi ~7 hours later. The product was washed twice with 150 ml of 1:1 methanol:water, once with 150 ml of 1,1,2-trichloro-1,2,2-trifluoroethane, filtered, and dried under vacuum, giving 23.9 g of white powder (96%). Under melt indexer conditions, no melt flow was observed at 372° C. with a 15-kg weight.

COMPARATIVE EXAMPLE 2

Low MW with chlorofluorocarbon Solvent at ~180° C.

1,1,2-Trichloro-1,2,2-trifluoroethane Solvent Tetrafluoroethylene Homopolymer Perfluoroazoisopropane Initiation A 400-ml vessel was loaded with 25 ml of 1,1,2-trichloro-1,2,2-trifluoroethane containing 0.05 mL of perfluoroazoisopropane, (CF$_3$)$_2$CFN=NCF(CF$_3$)$_2$. The pressure vessel was then chilled to ~ −31° C., the air removed with a vacuum pump, and 20 g of tetrafluoroethylene added. Polymerization set in during warm up, first becoming noticeable as a pressure drop at 181° C. and 389 psi and finishing at 180° C. and 189 psi ~6 hours later. The product was washed three times with 150 ml of 1,1,2-trichloro-1,2,2-trifluoroethane, filtered, and dried under vacuum, giving 18.2 g of white powder (91%). Under melt indexer conditions, a flow of 0.6 g/min was observed at 372° C. with a 5 kg weight indicative of a relatively low molecular weight for poly(tetrafluoroethylene) compared to Examples 10 and 11.

COMPARATIVE EXAMPLE 3

Low MW with Hydrofluorocarbon Solvent at ~180° C. 1,1,2-Trifluoro-2-trifluoromethylcyclobutane Solvent Tetrafluoroethylene Homopolymer Perfluoroisopropane Initiation A 400-ml vessel was loaded with 25 ml of 1,1,2-trifluoro-2-trifluoromethyl cyclobutane containing 0.05 mL of perfluoroazoisopropane, (CF$_3$)$_2$CFN=NCF(CF$_3$)$_2$. The pressure vessel was then chilled to ~ −31° C., the air removed with a vacuum pump, and 20 g of tetrafluoroethylene added. Polymerization set in during warm up, first becoming noticeable as a pressure drop at 182° C. and 407 psi and finishing at 180° C. and 230 psi ~6 hours later. The product was washed three times with 150 ml of 1,1,2-trichloro-1,2,2-trifluoroethane, filtered, and dried under vacuum, giving 12.0 g of white powder (61%). Under melt indexer conditions, a flow of 0.6 g/min was observed at 372° C. with a 5 kg weight indicative of a relatively low molecular weight for poly(tetrafluoroethylene) compared to Examples 10 and 11.

EXAMPLE 11

Bis(perfluoro-n-butyl) Sulfide Solvent Tetrafluoroethylene Homopolymer Perfluoroazoisopropane Initiation at 185°,to 215° C.

A 400 ml vessel was loaded with 25 ml of bis(perfluoro-n-butyl) sulfide containing 0.05 mL of perfluoroazoisopropane, (CF$_3$)$_2$CFN=NCF(CF$_3$)$_2$. The pressure vessel was then chilled to ~ −15° C., the air removed with a vacuum pump, and 20 g of tetrafluoroethylene added. Polymerization set in during warm up at 185° C. and 213 psi, temperature first passing through a maximum at 215° C. and 141 psi 5 minutes later and finally settling down to 183° C. and 34 psi after another 299 minutes. The product was washed three times with 50 mL of 1,1,2-trichloro-1,2,2-trifluoroethane, filtered, and dried under vacuum giving 19.1 g (95.5%) of white powder. Under melt indexer conditions, no melt flow was observed at 372° C. with a 15 kg weight. Polytetrafluoroethylene samples prepared under similar conditions except for the presence of CFC (Comparative Example 2) and HFC (Comparative Example 3) solvents were lower in molecular weight, extruding readily with just a 5 kg weight at 372° C.

What is claimed is:

1. A polymerization process, comprising, contacting a fluoromonomer, a free radical source capable of initiating polymerization of said fluoromonomer, and a solvent wherein the solvent is selected from I and II:

$$R_fSR'_f$$

where $R_f$ and $R'_f$ have the composition $CF_3(C_nF_{2n})+$ or $HCF_2(C_nF_{2n})-$ where n=0 to 9, are the same or different, are either linear or a chain containing one or more branches, and optionally containing one or more ether oxygens; and

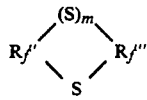  II where m=0 or 1; $R_f'$ and $R_f''$ are the same or different and have the formula $-C_XF_{2X}-$ where X=1 to 3;

provided that $R_f'$ and $R_f''$ taken together contain at least 4 carbon atoms when m=0; and further provided that the solvent is a fluid at polymerization temperature.

2. The process as recited in claim 1 wherein said solvent in formula II is selected so that m is 1 and X is 1.

3. The process as recited in claim 1 wherein said solvent in formula II is selected so that m is 1 and X is 2.

4. The process as recited in claim 1 wherein the solvent is selected from $CF_3CF_2SCF_2CF_3$ and $F(CF_2)_4S(CF_2)_4F$.

5. The process as recited in claim 1 wherein said fluoromonomer is vinyl fluoride; vinylidene fluoride; trifluoroethylene; chlorotrifluoroethylene; 1,2-difluoroethylene; tetrafluoroethylene; hexafluoropropylene; perfluoro(methyl vinyl ether); perfluoro(propyl vinyl ether); perfluoro(2,2-dimethyl-1,3-dioxole); $CF_2=CFOCF_2CF(CF_3)OCF_2CF_2SO_2F$; $CF_2=CFOCF_2CF(CF_3)OCF_2CF_2CO_2CH_3$; $CF_2=CFOCF_2CF_2SO_2F$; $F(CF_2)_nCH_2OCF=CF_2$ where n is 1, 2, 3, 4, or 5; $R^1CH_2OCF=CF_2$ where $R^1$ is hydrogen or $F(CF_2)_m-$ and m is 1, 2 or 3; or $R^3OCF=CH_2$ where $R^3$ is $F(CF_2)_z-$ where z is 1, 2, 3 or 4.

6. The process as recited in claim 5 wherein said fluoromonomer is 3,3,3-trifluoropropene, perfluoro(butyl)ethylene, 2-trifluoromethyl-3,3,3-trifluoro-1-propene, vinyl fluoride, vinylidene fluoride, tetrafluoroethylene, hexafluoropropylene, perfluoro(methyl vinyl ether), perfluoro(propyl vinyl ether), or perfluoro(2,2-dimethyl-1,3-dioxole).

7. The process of claim 5 wherein the fluoromonomer is selected from trifluoroethylene; chlorotrifluoroethylene; tetrafluoroethylene; hexafluoropropylene; perfluoro(methyl vinyl ether); perfluoro-(propyl vinyl ether); perfluoro(butyl)ethylene; 3,3,3-trifluoroethylene; and 2-trifluoromethyl-3,3,3-trifluoro-1-propene.

8. The process of claim 7 wherein the fluoromonomer is selected from trifluoroethylene; tetrafluoroethylene; hexafluoropropylene; perfluoro(methyl vinyl ether); and perfluoro(propyl vinyl ether).

9. The process as recited in claim 1 wherein said process proceeds at a temperature that is below about 200° C.

10. The process as recited in claim 9 wherein said temperature is $-20°$ C. to 150° C.

11. The process as recited in claim 10 wherein the temperature is $-20°$ C. to 80° C.

12. The process as recited in claim 1 wherein said free radical source is selected from fluorocarbon based acylperoxides, perfluoropropionyl peroxide, perfluoroalkylazo compounds, stable perfluoroalkyl radicals/hindered perfluoroalkanes, nitrogen fluorides, hydrocarbon acyl peroxides, hydrocarbon azo compounds, and inorganic/redox initiators.

13. The process as recited in claim 12 wherein the free radical source is selected from HFPO dimer peroxide, perfluoropropionylperoxide, perfluoroazoisopropane, and HFP trimer radical.

14. The process as recited in claim 1 wherein a tetrafluoroethylene/hexafluoropropylene, tetrafluoroethylene/hexafluoropropylene/vinylidene fluoride, hexafluoropropylene/vinylidene fluoride, tetrafluoroethylene/perfluoro (propyl vinyl ether), tetrafluoroethylene/perfluoro (2,2-dimethyl-1,3-dioxole), tetrafluoroethylene/ethylene, tetrafluoroethylene/-$CF_2=CFOCF_2CF(CF_3)OCF_2CF_2SO_2F$, tetrafluoroethylene/-$CF_2=CFOCF_2CF_2SO_2F$, or tetrafluoroethylene/propylene copolymer is produced.

15. The process as described in claim 1, wherein the reaction medium is an aqueous emulsion or aqueous suspension.

* * * * *